UNITED STATES PATENT OFFICE 2,622,976

METHOD OF TREATING SOIL FOR PRE-EMERGENT CONTROL OF WEEDS

Albert E. Hitchcock and Percy W. Zimmerman, Yonkers, N. Y., assignors to Boyce Thompson Institute For Plant Research, Inc., Yonkers, N. Y., a corporation of New York No Drawing. Application June 30, 1950, Serial No. 171,573

1 Claim. (Cl. 71—2.7)

This invention relates to herbicides and has for its object the provision of an improved method of killing plants and especially the selective killing of certain plants. Our invention is based upon our discovery that chloroacetic acid has pronounced herbicidal properties and may be used in such concentrations as to kill many plants, or in certain critical concentrations to effect a selective killing of certain plants of a group of plants in the same area.

Chloroacetic acid is not only an effective plant regulant but it has commercial and practical advantages because of its availability, low cost, and relatively high solubility in water. One of the unexpected and important characteristics of chloroacetic acid is that it can be readily taken up by one part of the plant and translocated to another part. If taken up by the roots, the chemical goes into the plant and kills the top of the plant. If applied to the top of the plant, it will migrate to the roots where eventually the whole plant might be killed.

The chloroacetic acid has plant regulant properties when applied to various plants in concentrations from 0.10% to 10%. At concentrations of 3% to 10% the compound functions as a general herbicide, while at lower concentrations (0.3% to 3%) it functions as a selective herbicide whereby many common weeds may be killed entirely or partly without causing noticeable injury to certain crop plants such as corn, potatoes, grasses, gladioli, and the like. The results of using aqueous spray solutions of chloroacetic acid are shown in the test of Table I. These tests show that sprays containing around 0.1% of the acid had no effect on either weeds or crop plants.

TABLE I

*Minimum concentrations of chloroacetic acid ($CH_2ClCOOH$) sprays effective for inducing the responses indicated. Entire plant sprayed unless otherwise noted*

| Species | Column Number | | | | |
|---|---|---|---|---|---|
| | 1 | 2 | 3 | 4 | 5 |
| | Complete plant killing | Complete top killing | Severe top injury | Slight top injury [1] | No injury |
| Weeds: | | | | | |
| Amaranthus | 1.0 | 1.0 | 0.32 | >0.1 | 0.1 |
| Chenopodium | 1.0 | 1.0 | 0.32 | >0.1 | 0.1 |
| Chickweed | 1.0 | 1.0 | 0.32 | >0.1 | 0.1 |
| Clover | 1.0 | 1.0 | 0.32 | >0.1 | 0.1 |
| Crab grass | 3.2 | 3.2 | 1.0 | 0.32 | 0.1 |
| Galinsoga | 1.0 | 1.0 | 0.32 | >0.1 | 0.1 |
| Oxalis | 1.0 | 1.0 | 0.32 | 0.1 | <0.1 |
| Purslane | 1.0 | 1.0 | 0.32 | >0.1 | 0.1 |
| Smartweed | 1.0 | 1.0 | 0.32 | >0.1 | 0.1 |
| Wild carrot | 1.0 | 1.0 | 0.32 | >0.1 | 0.1 |
| Water hyacinth | 10.0 | 3.2 | 1.0 | >0.32 | 0.1 |
| Alligator weed | >10.0 | 10.0 | 3.2 | 1.0 | <1.0 |
| Algae | 10.0 | 10.0 | 1.0 | <1.0 | <1.0 |
| Crop Plants: | | | | | |
| Barley | >1.0 | >1.0 | >1.0 | 1.0 | 0.32 |
| Buckwheat | 1.0 | 1.0 | 0.32 | >0.1 | 0.1 |
| 4–6″ Corn | 10.0 | 10.0 | 3.2 | 1.0 | 0.32 |
| 18–24″ Corn [2] | 10.0 | 10.0 | 10.0 | 3.2 | 1.0 |
| Euonymus | >10.0 | >10.0 | 10.0 | <10.0 | [3] 1.0 |
| Bean | 10.0 | 10.0 | 1.0 | <1.0 | <1.0 |
| Gladiolus [2] | >3.2 | >3.2 | >3.2 | 3.2 | 3.2 |
| Grasses (lawn) | >1.0 | >1.0 | >1.0 | 1.0 | 0.32 |
| Orchid | 1.0 | 1.0 | 1.0 | <1.0 | <1.0 |
| Peach (12″) | 10.0 | 10.0 | [4] 3.2 | [4] 1.0 | 1.0 |
| Pinus (2 yr.) | >3.2 | >3.2 | 3.2 | >1.0 | 1.0 |
| Tomato | 0.32 | 0.32 | 0.32 | 0.1 | 0.032 |
| Sorghum | >1.0 | >1.0 | >1.0 | 1.0 | 0.32 |
| Potato | >1.0 | >1.0 | >1.0 | 1.0 | 0.32 |

[1] Considered tolerant.
[2] Basal 4–6″ sprayed.
[3] Trace leaf spotting, no effect on buds or stems.
[4] Peach completely defoliated at 3.2 per cent with no injury to stem or buds. At 1.0 per cent partial defoliation (older leaves).

Some plants could be killed with 1% solutions, while others required up to 10%. For complete killing, solutions containing less than 1% were not effective. When applied at the rate of 20 to 40 pounds per acre as a pre-emergence spray to soil, chloroacetic acid kills young weeds without causing injury to corn planted just before the spray is applied. Buds of potato tubers may be inhibited or killed without noticeable injury to the tuber. The effectiveness of soil applications of chloroacetic acid in killing young tomato plants (screening test) is illustrated in Table II.

Chloroacetic acid is selective in its action in the killing of many different kinds of plants. For example, crabgrass can be killed in late May or June without noticeable injury to Kentucky blue grass.

At the present time there is no satisfactory herbicide for applying to the weeds in rows of growing vegetables such as potatoes, carrots, cabbage, beans and the like where it is necessary to follow one crop with another. Chloroacetic acid exhibits no objectionable residual effect. In fact, seeds can be planted the day after spraying the soil.

Chloroacetic acid in suitable concentrations produces rapid killing and does not impart any objectionable taste to vegetables sprayed between the rows.

Chloroacetic acid may be applied in such concentrations as to effect a mere defoliation or to the flowers or young set fruit (calyx stage) to effect blossom or fruit thinning. It may be applied, for example, to potato vines just before harvesting to kill the vines, without injury to the tubers.

TABLE II

*Results obtained by applying chloroacetic acid ($CH_2ClCOOH$) to the soil of tomato plants growing in four-inch pots. Three plants to each treatment*

| No. cc. per 4″ Pot | 1.0% | | | 0.32% | | | 0.1% | | |
|---|---|---|---|---|---|---|---|---|---|
| | Mg./Pot | Percent Kill | No. Days | Mg./Pot | Percent Kill | No. Days | Mg./Pot | Percent Kill | No. Days |
| 10 | 100 | 100 | 4 | 32 | ¹30 | 3 | 10 | 0 | -------- |
| 20 | 200 | 100 | 3 | 64 | 100 | 3 | 20 | 0 | -------- |
| 40 | 400 | 100 | 2 | 128 | 100 | 3 | 40 | 30 | 6 |

¹ 1 plant dead, 2 plants basal collapse in 6 days at 32 mg. per 4″ pot rate of application.

The following species were not injured when $CH_2ClCOOH$ was applied to the soil at the rate of 32 mg. per 4″ pot:

Lawn grasses  
Corn  
Barley  
Sorghum

We claim:

The method of controlling the growth of weeds comprising the pre-emergence treatment of soil with an aqueous solution of chloroacetic acid in an amount varying from 20 to 40 pounds of chloroacetic acid per acre, the soil having been previously planted to seeds for the growing of a crop.

ALBERT E. HITCHCOCK.
PERCY W. ZIMMERMAN.

REFERENCES CITED

The following references are of record in the file of this patent:

UNITED STATES PATENTS

| Number | Name | Date |
|---|---|---|
| 2,282,732 | Lean | May 12, 1942 |

OTHER REFERENCES

"The Chemistry and Uses of Insecticides," by de Ong (1948), pages 173 and 174.